(12) United States Patent
Krych et al.

(10) Patent No.: US 11,858,577 B2
(45) Date of Patent: Jan. 2, 2024

(54) MOTORCYCLE TRIM COMPONENT AND MOTORCYCLE ASSEMBLY

(71) Applicant: Bayerische Motoren Werke Aktiengesellschaft, Munich (DE)

(72) Inventors: Tim Krych, Munich (DE); Martin Pazulla, Wolfratshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 510 days.

(21) Appl. No.: 17/260,639

(22) PCT Filed: Jun. 11, 2019

(86) PCT No.: PCT/EP2019/065188
§ 371 (c)(1),
(2) Date: Jan. 15, 2021

(87) PCT Pub. No.: WO2020/015925
PCT Pub. Date: Jan. 23, 2020

(65) Prior Publication Data
US 2021/0268970 A1 Sep. 2, 2021

(30) Foreign Application Priority Data
Jul. 18, 2018 (DE) ...................... 10 2018 211 953.8

(51) Int. Cl.
*B62J 11/16* (2020.01)
*B60R 13/02* (2006.01)
*F16L 3/26* (2006.01)
*B62J 1/00* (2006.01)

(52) U.S. Cl.
CPC ............. *B62J 11/16* (2020.02); *B60R 13/02* (2013.01); *B62J 1/00* (2013.01); *F16L 3/26* (2013.01)

(58) Field of Classification Search
CPC ... B62J 11/10; B62J 11/16; B62J 11/14; B62J 15/00; B62J 17/00; B62J 11/00; B60R 16/0215; F16L 3/26; F16L 3/10; H02G 3/32
USPC ................................. 296/198, 78.1; 293/105
See application file for complete search history.

(56) References Cited

FOREIGN PATENT DOCUMENTS

| CN | 1532111 A | 9/2004 | |
|---|---|---|---|
| CN | 203473161 U | 3/2014 | |
| DE | 10 2008 023 241 A1 | 11/2009 | |
| DE | 10 2012 012 022 A1 | 12/2013 | |
| EP | 3378750 B1 * | 11/2019 | ............. B62J 11/13 |
| JP | 2001-146185 A | 5/2001 | |
| JP | 2003-72623 A | 3/2003 | |
| JP | 2012-166660 A | 9/2012 | |

OTHER PUBLICATIONS

International Search Report (PCT/ISA/210) issued in PCT Application No. PCT/EP2019/065188 dated Aug. 28, 2019 with English translation (four (4) pages).
English translation of Chinese Office Action issued in Chinese Application No. 201980039686.6 dated Apr. 23, 2023 (6 pages).

* cited by examiner

*Primary Examiner* — Dennis H Pedder
(74) *Attorney, Agent, or Firm* — Crowell & Moring LLP

(57) ABSTRACT

A motorcycle trim component includes a hose guide designed to receive and hold a hose. The hose guide is formed integrally with the motorcycle trim component. The hose guide is designed to be incorporated into a motorcycle assembly having a brake line, with the brake line being accommodated in the hose guide.

8 Claims, 2 Drawing Sheets

MOTORCYCLE TRIM COMPONENT AND MOTORCYCLE ASSEMBLY

BACKGROUND AND SUMMARY OF THE INVENTION

The present invention relates to a motorcycle trim component and to a motorcycle assembly.

In order to guide the brake line, separate holders are customarily provided in motorcycles, the holders being screwed to a body. The fastening of the holders thus requires a separate installation step, which has a disadvantageous effect on an overall installation time that is required for the manufacturing of a motorcycle. In addition, additional costs arise because of the holder.

It is therefore an object of the present invention to provide a cost-effective and rapidly mountable guide for a brake line.

This object is achieved according to the invention by a motorcycle trim component, comprising a line duct which is designed for receiving and holding a hose and which is formed integrally with the trim component. The hose is, for example, a brake line.

The integral formation of the line duct with the motorcycle trim component makes it possible to dispense with a separate holder, which in turn leads to cost savings. In addition, the installation can thereby be simplified. In particular, no additional holder has to be handled and fastened.

According to a preferred embodiment, the line duct comprises at least one holding clamp which is movable into a holding position in order to secure the hose. The holding clamp makes it possible for the hose to be installed on the motorcycle trim component in a particularly simple manner. For example, the hose can be mounted on the motorcycle trim component by the holding clamp by simple folding over of the holding clamp.

The at least one holding clamp can be mounted on the rest of the trim component by means of a film hinge. The at least one holding clamp is thus arranged pivotably and at the same time captively on the motorcycle trim component. A film hinge also constitutes a particularly cost-effective possibility for pivotably mounting the holding clamp on the motorcycle trim component.

The motorcycle trim component is, for example, a plastics injection molded part, wherein the holding clamp is formed integrally with the motorcycle trim component.

According to a preferred embodiment, a cross-sectionally U-shaped channel is formed on the trim component, wherein the holding clamp is arranged at a free longitudinal edge of the U-shaped channel and is pivotable relative to the channel by means of the at least one film hinge, in order to close the channel. The hose can be inserted into the channel before the holding clamp is pivoted into its holding position. The hose is thereby securely fixed on the motorcycle trim component. Furthermore, the U shape of the channel enables the channel to surround or shield the hose circumferentially at least in sections such that a hose portion running in the channel is protected from damage.

Depending on requirements, the channel can have a rectilinear or curved profile.

In order to further improve guiding of the hose in the channel, at least two holding clamps can be arranged on the channel, wherein the holding clamps are in each case adjacent to opposite longitudinal ends of the channel. It is thereby ensured that, after installation is finished, the hose remains in the channel along the entire longitudinal extent of the channel.

The holding clamp is preferably supported on an adjacent component in a mounted position of the trim component and is thereby held in a holding position. This has the advantage that no additional fastening means, such as for example screws or clips, are required in order to hold the holding clamp in its holding position. In particular, the installation can be undertaken without tools.

According to one embodiment, the holding clamp has a substantially L-shaped profile, wherein the holding clamp is supported on an adjacent component by means of a transverse web of the L-profile in a mounted position of the trim component. The L shape of the holding clamp consequently makes it possible for one limb of the L-shaped holding clamp to serve for closing the channel and for a further limb to serve for supporting the holding clamp. The hose can thereby be held particularly reliably in the channel. In addition, it is ensured that the holding clamp cannot move out of its holding position in an assembled state of a motorcycle.

According to one embodiment, the trim component is a rear wheel cover. The line duct can thus be integrated into an already existing component.

The object is furthermore achieved according to the invention by a motorcycle assembly having a motorcycle trim component, which is designed as described above, and a brake line, wherein the brake line is accommodated in the line duct. By means of such a motorcycle assembly, the brake line can be guided on the motorcycle trim component in accordance with a designated course without a separate holder being necessary.

At least one further vehicle component is preferably provided, in particular a body component of the motorcycle, wherein the brake line is arranged in the channel of the motorcycle trim component, and at least one holding clamp is arranged on the motorcycle trim component in a holding position and is held in the holding position by the at least one further vehicle component. The holding clamp is thus held in its holding position by a component which is present in any case, which has the advantage that no additional fastening means or similar are necessary. The motorcycle assembly can thus be particularly cost-effective.

Further advantages and features of the invention are apparent from the following description and from the following drawings, to which reference is made. In the drawings:

DETAILED DESCRIPTION

Figure 1:
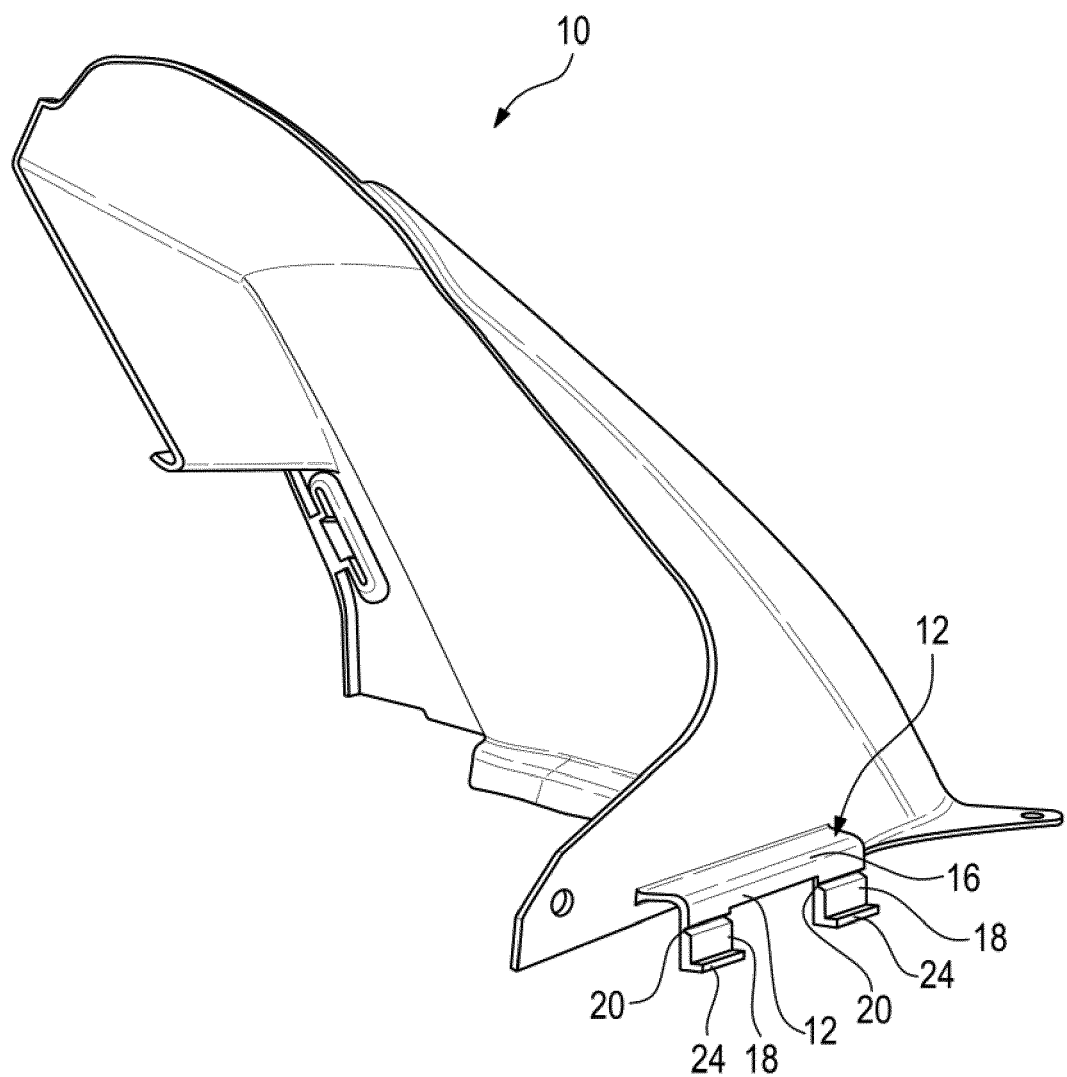
FIG. 1 shows a motorcycle trim component according to an embodiment of the present invention.

FIG. 1 shows a motorcycle trim component 10 according to the invention, in particular a rear wheel cover. The motorcycle trim component is preferably a plastics injection molded component.

Figure 2:
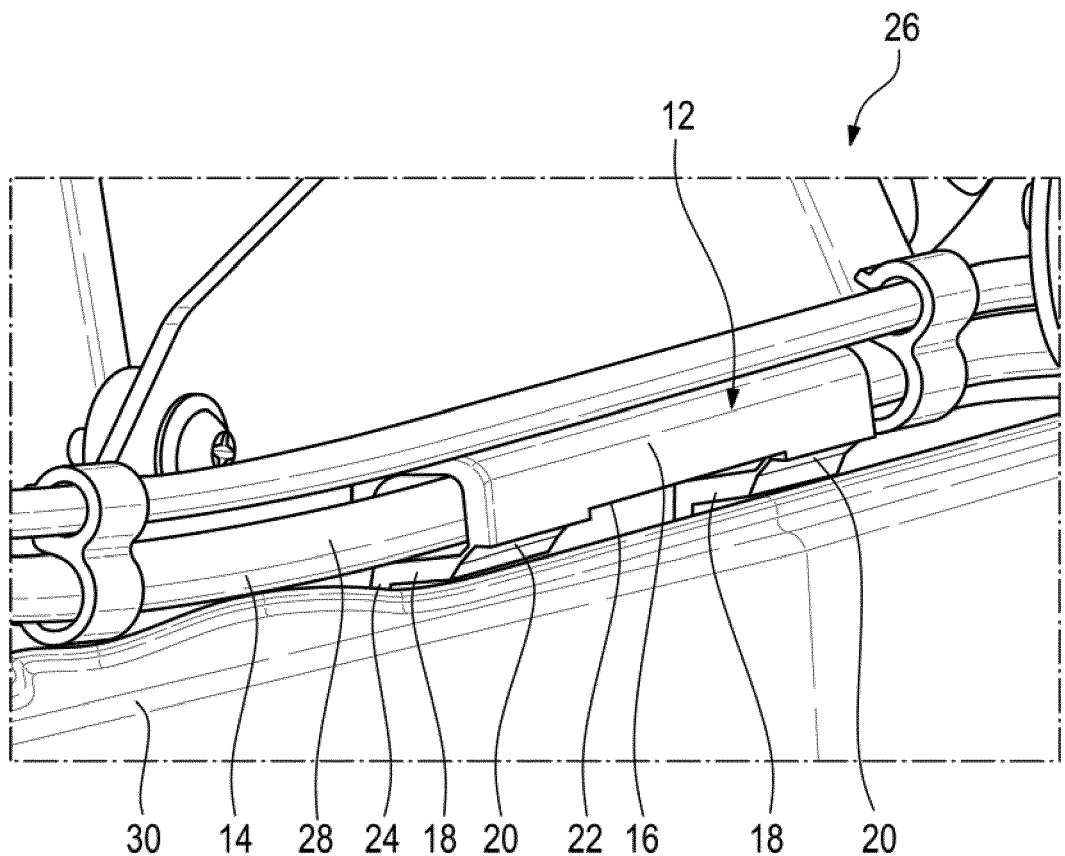
FIG. 2 shows a motorcycle assembly with the motorcycle trim component of FIG. 1.

A line duct 12 which is formed integrally with the motorcycle trim component 10 is arranged on the motorcycle trim component 10. The line duct 12 is designed for receiving and holding a hose 14, which is illustrated in FIG. 2, in particular a brake line.

As can be seen in FIG. 1, the line duct 12 comprises a cross-sectionally U-shaped channel 16, into which a hose 14 can be placed, and two holding clamps 18.

The holding clamps 18 are fastened to the rest of the motorcycle trim component 10 by means of a film hinge 20 and can be pivoted from an installation position, which is illustrated in FIG. 1, into a holding position. In the holding position, the holding clamps 18 at least partially close the channel 16 in order to secure a hose 14 that is located in the channel 16.

In the embodiment illustrated, the holding clamps are arranged at a free longitudinal edge 22 of the channel 16. This is advantageous in respect of being able to remove the motorcycle trim component 10 from the mold.

In order to hold a hose 14 in the channel 16 along the entire length of the channel 16, two holding clamps 18 which are adjacent to opposite longitudinal ends of the channel 16 are provided. In the case of a channel 16 having a particularly large longitudinal extent, at least one holding clamp 18 can be additionally provided in the center of the channel 16.

The holding clamp 18 has a substantially L-shaped profile. This shape of the holding clamp 18 serves for the holding clamp 18 to be able to be supported on an adjacent component by means of a transverse web 24 of the L-profile in a mounted position of the trim component 10. This will be explained more precisely below in conjunction with FIG. 2. In a mounted state, the transverse web 24 extends from the holding clamp 18 in a direction away from the channel 16.

FIG. 2 shows a motorcycle assembly 26 according to the invention having a motorcycle trim component 10, in particular having the motorcycle trim component 10 according to the invention that is described in conjunction with FIG. 1.

In addition, the motorcycle assembly 26 comprises a hose 14, in particular a brake line 28, wherein the brake line 28 is accommodated in the line duct 12. In more precise terms, the brake line 28 is arranged in the channel 16 of the motorcycle trim component 10.

Furthermore, at least one further vehicle component 30 is provided, in particular a body component of the motorcycle.

The two holding clamps 18 on the motorcycle trim component 10 are arranged in a holding position and are held in the holding position by the at least one further vehicle component 30. The transverse web 24 of the L-shaped holding clamp 18 is supported here on the edge of the directly adjacent vehicle component 30.

What is claimed is:

1. A motorcycle assembly, comprising:
    a motorcycle trim component, comprising:
        a line duct configured to receive a hose within the line duct, and comprising a holding clamp configured to hold the hose within the line duct, wherein
        the line duct is formed integrally with the motorcycle trim component, and
        the holding clamp is rotatably mounted to the line duct via a film hinge having an L-shaped profile to hold the hose within the line duct; and
    a vehicle component adjacent to the motorcycle trim component, wherein
        the holding clamp is supported on the adjacent vehicle component via a transverse web of the L-shaped profile.

2. The motorcycle assembly according to claim 1, wherein
    a cross-sectionally U-shaped channel is formed on the motorcycle trim component,
    the holding clamp is connected to a free longitudinal edge of the U-shaped channel by the film hinge, and
    the holding clamp is pivotable relative to the U-shaped channel and configured to permit closing of the U-shaped channel.

3. The motorcycle assembly according to claim 2, wherein
    at least two holding clamps are arranged on the U-shaped channel, and
    the holding clamps are in each case adjacent to opposite longitudinal ends of the U-shaped channel.

4. The motorcycle assembly according to claim 3, wherein
    the holding clamp is held in a holding position by the adjacent vehicle component when in an installed position of the motorcycle trim component.

5. The motorcycle assembly according to claim 1, wherein
    the motorcycle trim component is a rear wheel cover.

6. A motorcycle, comprising:
    a motorcycle assembly according to claim 1; and
    a brake line, wherein
        the brake line is located in the line duct.

7. The motorcycle according to claim 6, wherein
    the brake line is arranged in a channel of the motorcycle trim component, and
    at least one holding clamp is arranged on the motorcycle trim component in a holding position and is held in the holding position by the vehicle component.

8. The motorcycle according to claim 7, wherein
    the vehicle component is a body component of the motorcycle.

* * * * *